United States Patent
Takano et al.

(10) Patent No.: US 8,516,970 B2
(45) Date of Patent: Aug. 27, 2013

(54) DEVICE FOR REDUCING FRICTIONAL RESISTANCE OF SHIP BODY

(75) Inventors: Shinichi Takano, Nagasaki (JP); Shuji Mizokami, Minato-ku (JP); Seijiro Higasa, Nagasaki (JP); Shoichi Kameyama, Nagasaki (JP); Takashi Mine, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 251 days.

(21) Appl. No.: 13/128,959

(22) PCT Filed: Feb. 16, 2009

(86) PCT No.: PCT/JP2009/052570
§ 371 (c)(1),
(2), (4) Date: May 12, 2011

(87) PCT Pub. No.: WO2010/058612
PCT Pub. Date: May 27, 2010

(65) Prior Publication Data
US 2011/0220002 A1 Sep. 15, 2011

(30) Foreign Application Priority Data
Nov. 21, 2008 (JP) ................................ 2008-298730

(51) Int. Cl.
*B63B 1/38* (2006.01)
(52) U.S. Cl.
USPC ........................................................ 114/67 A
(58) Field of Classification Search
USPC ........................................................ 114/67 A
See application file for complete search history.

(56) References Cited

U.S. PATENT DOCUMENTS

| 4,840,589 A | | 6/1989 | Breaux |
| 6,145,459 A | * | 11/2000 | Takahashi et al. .......... 114/67 A |
| 6,186,085 B1 | * | 2/2001 | Kato et al. ................... 114/67 A |

FOREIGN PATENT DOCUMENTS

| CN | 1899978 | 1/2007 |
| EP | 0 903 287 | 3/1999 |
| JP | 61-33389 | 2/1986 |

(Continued)

OTHER PUBLICATIONS

Japanese Decision of a Patent Grant issued May 25, 2012 in corresponding Japanese Patent Application No. 2008-298730 with partial English translation.

(Continued)

*Primary Examiner* — Lars A Olson
*Assistant Examiner* — Anthony Wiest
(74) *Attorney, Agent, or Firm* — Wenderoth, Lind & Ponack, L.L.P.

(57) ABSTRACT

A ship-body frictional resistance reducing device for reducing frictional resistance of a sailing ship body by forming an air bubble curtain 8 on a ship's bottom by generating air bubbles includes an air chamber 22a provided on the ship's bottom 5 inside the ship body, a plurality of air ejection holes formed in an arrayed manner on the ship's bottom 5 that becomes a bottom portion of the air chamber 22a, and a sea chest 35 provided on the ship's bottom 5 inside the ship body in a manner such that the sea chest 35 covers the air chamber 22a. With this configuration, it is possible to perform maintenance of the air chamber 22a, and at the same time, it is possible to take a watertight structure to prevent ingress of the sea water into the ship body.

6 Claims, 5 Drawing Sheets

(56) References Cited

FOREIGN PATENT DOCUMENTS

| JP | 10-29586 | 2/1998 |
|---|---|---|
| JP | 10-95389 | 4/1998 |
| JP | 10-100984 | 4/1998 |
| JP | 11-59563 | 3/1999 |
| JP | 11-180382 | 7/1999 |
| JP | 11-222180 | 8/1999 |
| JP | 11-227675 | 8/1999 |
| JP | 3120019 | 3/2006 |
| JP | 2008-149209 | 7/2008 |

OTHER PUBLICATIONS

Japanese Office Action mailed Mar. 6, 2012 in corresponding Japanese Patent Application No. 2008-298730 with English translation.

International Search Report issued May 26, 2009 in International (PCT) Application No. PCT/JP2009/052570.

Written Opinion of the International Searching Authority issued May 26, 2009 in International (PCT) Application No. PCT/JP2009/052570.

Chinese Office Action issued Mar. 29, 2013 in corresponding Chinese Patent Application No. 200980146462.1 with English translation.

Korean Notice of Allowance mailed Apr. 1, 2013 in corresponding Korean Patent Application No.10-2011-7010771 with English translation.

Supplementary European Search Report dated Apr. 5, 2013 in corresponding European Patent Application No. 09827393.1.

\* cited by examiner

DEVICE FOR REDUCING FRICTIONAL RESISTANCE OF SHIP BODY

TECHNICAL FIELD

The present invention relates to a ship-body frictional resistance reducing device for reducing frictional resistance of a sailing ship body by forming an air bubble curtain on a ship's bottom by generating air bubbles from a plurality of air ejection holes formed on the ship's bottom.

BACKGROUND ART

An air ejection device for a frictional-resistance reducing ship has been known, which is formed by arranging a plurality of air ejection units on an outer plate of a ship's bottom in a ship width direction (see, for example, Patent Document 1). In this air ejection device for the frictional-resistance reducing ship, a sea chest extending continuously across the ship width direction is provided, which is attached to the inside of the outer plate of the ship's bottom in a manner such that the air ejection units are put in communications.
Patent Document 1: Japanese Patent Application Laid-open No. H11-227675

DISCLOSURE OF INVENTION

Problem to be Solved by the Invention

However, the sea chest and the outer plate of the ship's bottom are generally formed in a watertight structure to prevent ingress of the sea water into the inside of a ship body considering the safety. That is, the sea chest and the outer plate of the ship's bottom are integrally formed by, for example, welding or the like. On the other hand, because the sea water flows into the sea chest through each of the air ejection units, marine species may adhere to the inside of the sea chest or the inside of the sea chest may become rusted by the sea water. Therefore, maintenance of the inside of the sea chest needs to be performed on a regular basis. However, with the structure of the conventional air ejection device for the frictional-resistance reducing ship, it is not possible for a worker to enter the inside of the sea chest, making it difficult to perform the maintenance.

Therefore, an object of the present invention is to provide a ship-body frictional resistance reducing device that is possible to easily perform maintenance of an air chamber with a plurality of air ejection holes formed on its bottom portion and to take a watertight structure to prevent ingress of sea water into a ship body.

Means for Solving Problem

According to an aspect of the present invention, a ship-body frictional resistance reducing device for reducing frictional resistance of a sailing ship body by forming an air bubble curtain on a ship's bottom by generating air bubbles includes: an air chamber provided on the ship's bottom inside the ship body; a plurality of air ejection holes formed in an arrayed manner on the ship's bottom that becomes a bottom portion of the air chamber; and a sea chest provided on the ship's bottom inside the ship body in a manner such that the sea chest covers the air chamber.

Advantageously, in the ship-body frictional resistance reducing device, a partition wall for partitioning an inside space is provided in the sea chest, and a through hole is formed on the partitioning wall.

Advantageously, the ship-body frictional resistance reducing device further includes: an entryway formed on the ship's bottom; and a passage that connects the entryway and an inside of the sea chest.

Advantageously, in the ship-body frictional resistance reducing device, the air chamber includes a lower casing arranged on the ship's bottom side and an upper casing arranged on a shipboard side, and the upper casing is configured to be coupled with the lower casing in a detachable manner.

Effect of the Invention

According to a first embodiment of the ship-body frictional resistance reducing device, it is possible to configure the sea chest in a watertight structure while the sea water flows into the inside of the air chamber in which a plurality of air ejection holes are formed on its bottom portion. That is, the air chamber and the sea chest form a dual structure. With this configuration, because the working area can be provided between the sea chest and the air chamber, it is possible to perform maintenance of the air chamber. Furthermore, because the sea chest can be made in a watertight structure, it is possible to prevent ingress of the sea water into the ship body.

According to a second embodiment of the ship-body frictional resistance reducing device, even though the inside of the sea chest is partitioned by a partitioning wall, such as a longitudinal, into a plurality of divided working areas, by forming a through hole on the partitioning wall, it is possible to come and go to the divided working areas through the through hole. With this configuration, even when the air chamber is arranged in each of the divided working areas, it is possible to perform maintenance of each of the air chambers in an efficient manner.

According to a third embodiment of the ship-body frictional resistance reducing device, it is possible to access the inside of the sea chest through a passage from an entryway formed on the ship's bottom.

According to a fourth embodiment of the ship-body frictional resistance reducing device, it is possible to easily perform maintenance of the inside of the air chamber by configuring the upper casing to be coupled with the lower casing of the air chamber in a detachable manner.

Figure 1:
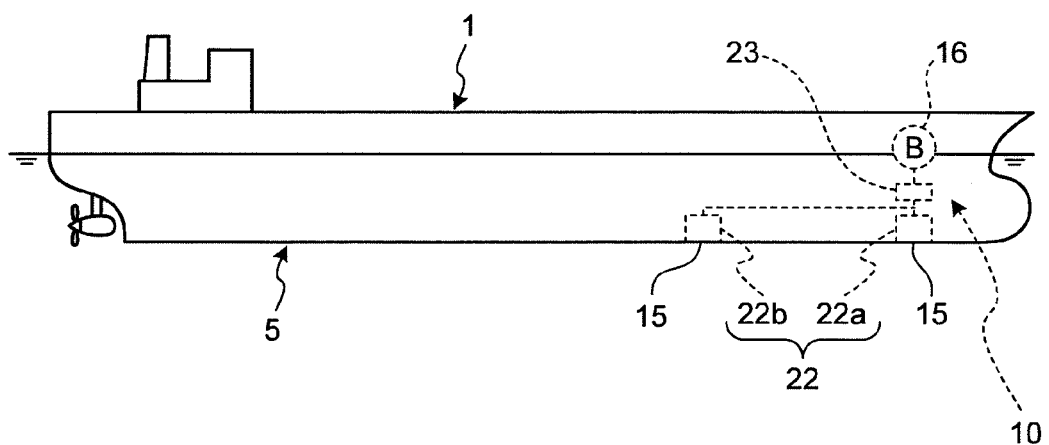
FIG. 1 is a side view schematically depicting a ship body having incorporated thereon a ship-body frictional resistance reducing device according to an embodiment of the present invention.

EXPLANATIONS OF LETTERS OR NUMERALS 1 ship body
5 ship's bottom 8 air bubble curtain
10 ship-body frictional resistance reducing device
15 air ejection hole
16 blower
17 air supply path
20 main supply pipe
21 branch supply pipe
22 air chamber
22a center air chamber
22b side air chamber
23 primary air tank
24 air flow meter
25 on-off valve
28 air supply port
30a center air-ejection hole group
30b side air-ejection hole group
35 center sea chest
36 side sea chest
40 insertion port
45 longitudinal
48 intercommunicating through hole
50 access room
51 entryway
52 access through hole
55 lower casing
56 upper casing
59 lower flange
58 upper flange
V1 working area
V2 divided working area

BEST MODE(S) FOR CARRYING OUT THE INVENTION

Exemplary embodiments of a ship-body frictional resistance reducing device according to the present invention will be explained below in detail with reference to the accompanying drawings. The present invention is not limited to the embodiments. In addition, constituent elements in the following embodiments include those that can be easily replaceable by persons skilled in the art or that are substantially equivalent.

Embodiment

Figure 2:
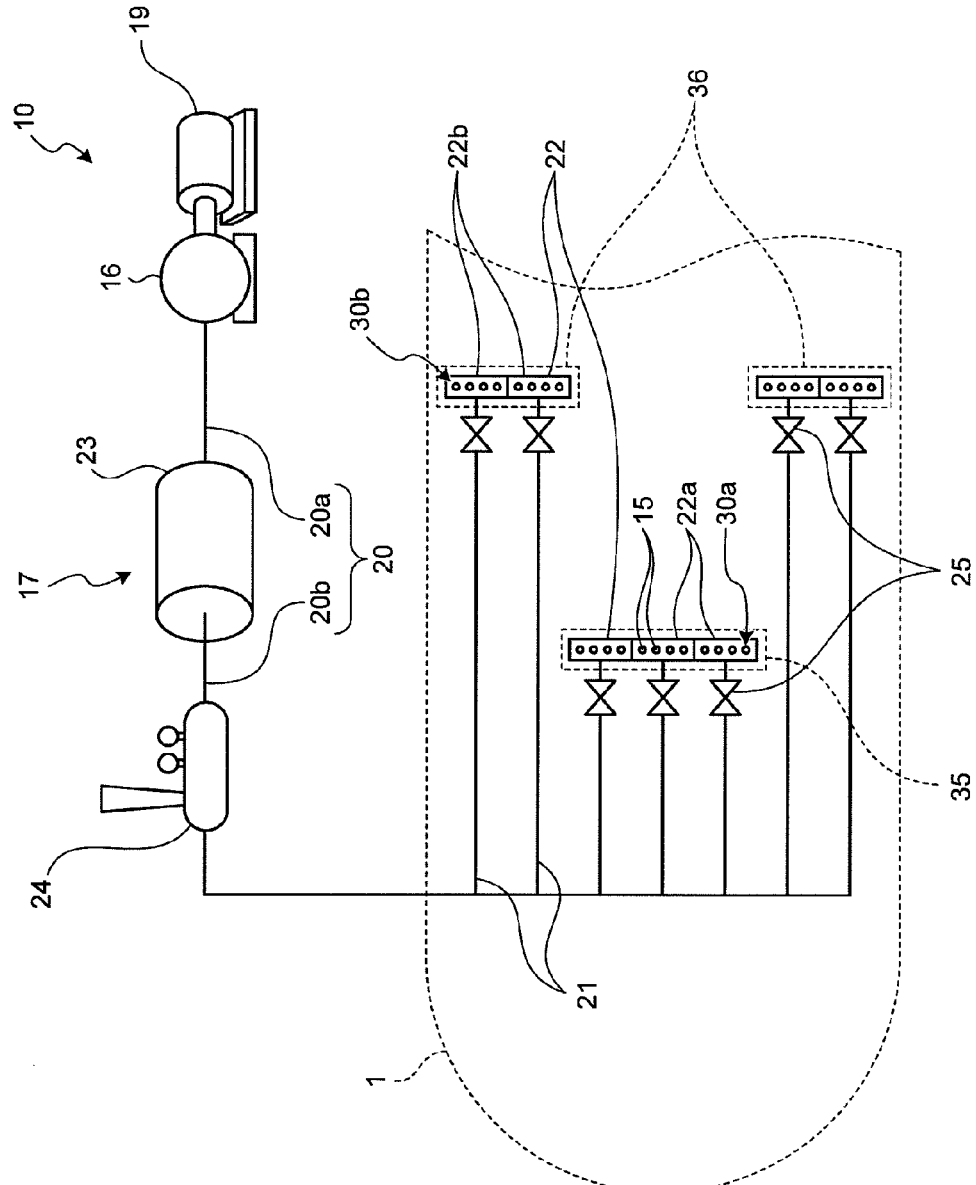
FIG. 2 is an explanatory diagram of a configuration of the ship-body frictional resistance reducing device according to the embodiment.
Figure 3:
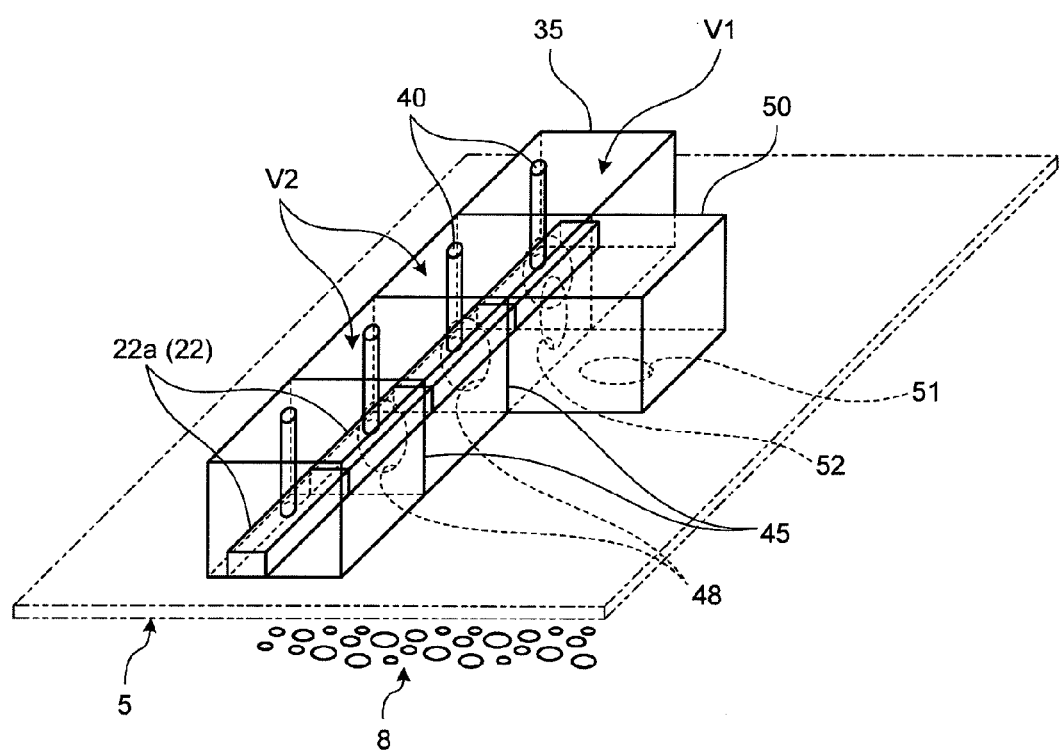
FIG. 3 is a perspective view schematically depicting a portion around a sea chest of the ship-body frictional resistance reducing device according to the embodiment.
Figure 4:
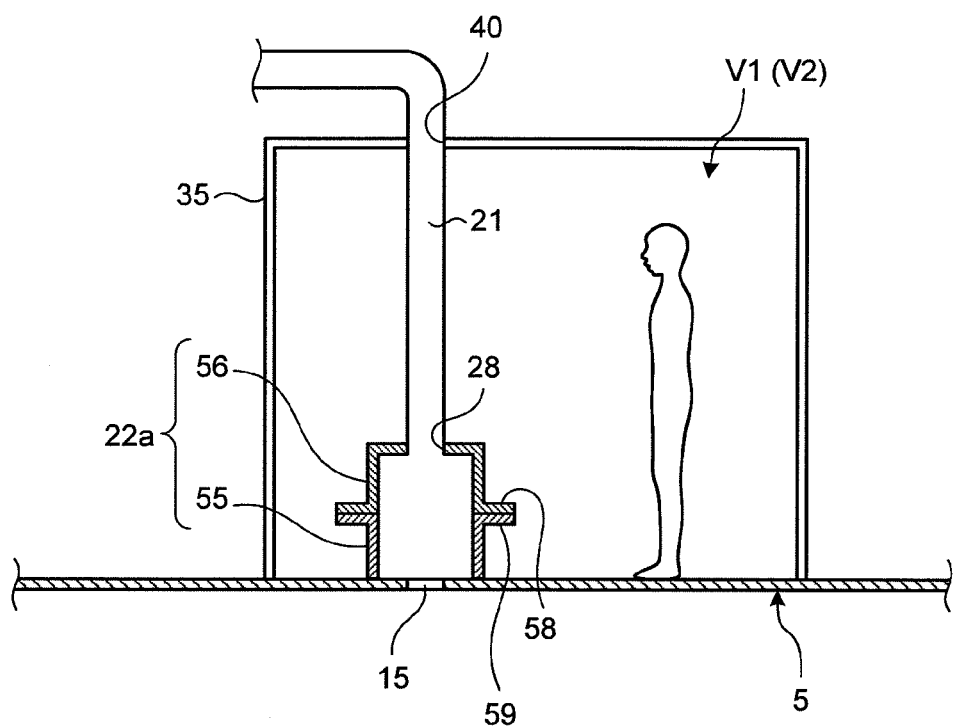
FIG. 4 is a cross-sectional view of the sea chest according to the embodiment shown in FIG. 3, along a cutting plane A shown in FIG. 3.
Figure 5:
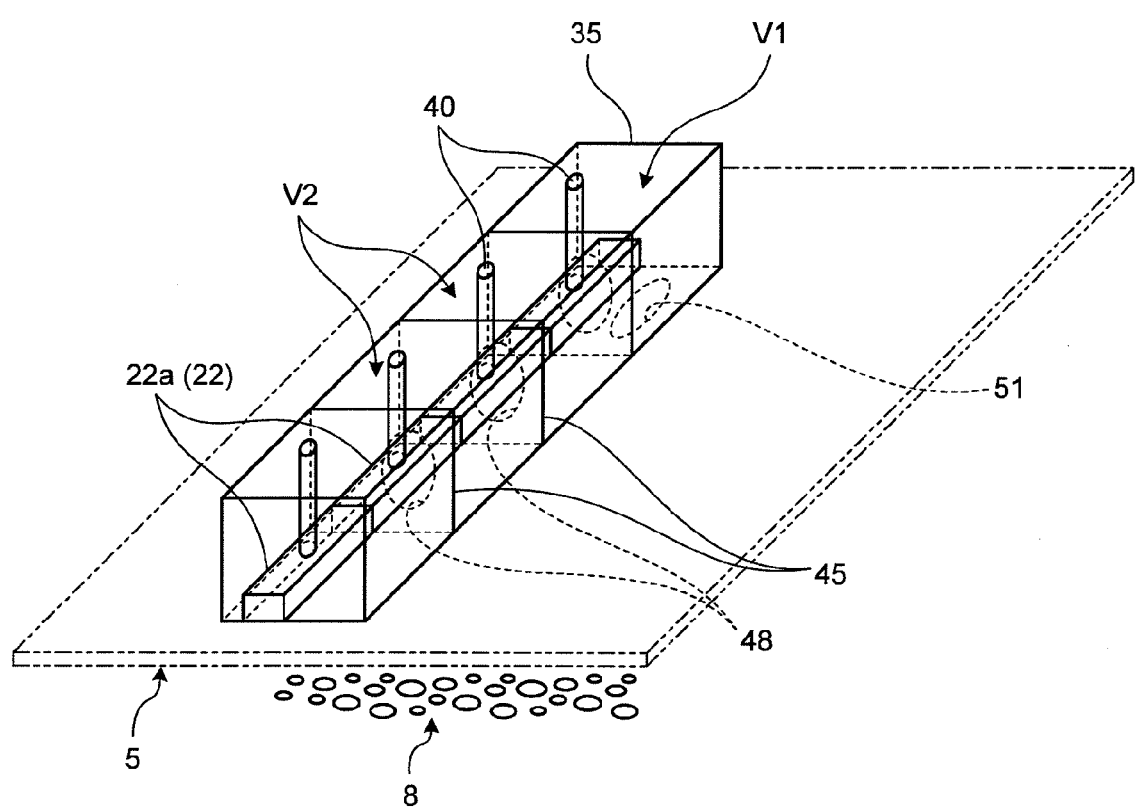
FIG. 5 is a perspective view schematically depicting a portion around a sea chest of a ship-body frictional resistance reducing device according to a modification of the embodiment.

FIG. 1 is a side view schematically depicting a ship body having incorporated thereon a ship-body frictional resistance reducing device according to an embodiment of the present invention; FIG. 2 is an explanatory diagram of a configuration of the ship-body frictional resistance reducing device according to the present embodiment; FIG. 3 is a perspective view schematically depicting a portion around a sea chest of the ship-body frictional resistance reducing device according to the present embodiment; FIG. 4 is a cross-sectional view of the sea chest according to the present embodiment shown in FIG. 3, along a cutting plane A shown in FIG. 3; and FIG. 5 is a perspective view schematically depicting a portion around a sea chest of a ship-body frictional resistance reducing device according to a modification of the present embodiment.

A ship-body frictional resistance reducing device according to the present embodiment reduces the frictional resistance of a sailing ship body 1 by forming an air bubble curtain 8 (see FIG. 3) on a ship's bottom 5 by generating air bubbles from a plurality of air ejection holes 15 formed on the ship's bottom 5. As shown in FIG. 1, the ship body 1 having incorporated thereon the ship-body frictional resistance reducing device 10 is, for example, a flat-bottomed ship in which the ship's bottom 5 is flat, and the ship-body frictional resistance reducing device 10 is arranged on a bow side of the ship body 1. The ship-body frictional resistance reducing device 10 is not limited to be applied to the flat-bottomed ship, but also can be applied to other types of ships.

The ship-body frictional resistance reducing device 10 is explained with reference to FIG. 1 and FIG. 2. The ship-body frictional resistance reducing device 10 includes a large number of the air ejection holes 15 formed on the ship's bottom 5, a blower 16 that can supply the air to the large number of the air ejection holes 15, and an air supply path 17 that connects the blower 16 and the large number of the air ejection holes 15.

The large number of the air ejection holes constitute air-ejection hole groups 30a, 30b, and 30b arranged in a ship width direction of the ship body 1. The air-ejection hole groups 30a, 30b, and 30b are formed on the ship's bottom 5 more than one (for example, three in the present embodiment). One of the three air-ejection hole groups 30a, 30b, and 30b is the center air-ejection hole group 30a formed at the center of the bow side in the ship width direction, and the rest two make a pair of side air-ejection hole groups 30b and 30b formed at both sides of the center air-ejection hole group 30a on a stern side from the center air-ejection hole group 30a. Specifically, the center air-ejection hole group 30a is arranged on the bow side of the ship body 1, and the pair of the side air-ejection hole groups 30b and 30b are formed near a center of the ship body 1.

The blower 16 is arranged on the bow side of the ship body 1, functioning as an air supply source that can supply the air to the large number of the air ejection holes 15. An electric motor 19 is employed as a driving source for the blower 16, and an amount of supplying the air sent from the blower 16 can be controlled by controlling a rotation speed of the electric motor 19. A distance between the blower 16 and the center air-ejection hole group 30a is shorter than a distance between the blower 16 and the side air-ejection hole groups 30b and 30b, so that both the blower 16 and the center air-ejection hole group 30a are arranged on the bow side of the ship body 1. The air supply source is not limited to the blower 16, but can be an air compressor or the like. Furthermore, although the air supply source is configured with a single unit of the blower 16 in the present embodiment, the air supply source is not limited to this configuration, but also can be configured with a plurality of blowers 16.

The air supply path 17 includes a main supply pipe 20 of which one end is connected to the blower 16, a plurality of branch supply pipes 21 connected to the main supply pipe 20, and a plurality of air chambers 22 respectively connected to the branch supply pipes 21. A primary air tank 23 is provided on the main supply pipe 20. That is, the main supply pipe 20 is configured with an upstream-side main supply pipe 20a connecting the blower 16 and the primary air tank 23 and a downstream-side main supply pipe 20b connecting the primary air tank 23 and the branch supply pipes 21. An air flow meter 24 for measuring a flow rate of the air flowing through the downstream-side main supply pipe 20b is provided on the downstream-side main supply pipe 20b. An on-off valve 25 for opening and closing a pipe is provided on each of the branch supply pipes 21.

The primary air tank 23 is configured to be able to store the air supplied from the blower 16 via the upstream-side main supply pipe 20a. By providing the primary air tank 23 on the main supply pipe 20, it is possible to cope with a pressure change of the air (a so-called pulsation of the air) generated at the blower 16 and the upstream-side main supply pipe 20a.

The air chambers 22 are formed in a box shape of a rectangular cuboid, being arranged corresponding to the air ejection holes 15 formed on the ship's bottom 5. That is, the air ejection holes 15 are formed on a bottom surface of each of the air chambers 22 (that is, the ship's bottom). Furthermore, an air supply port 28 to which each of the branch supply pipes 21 is connected is formed substantially at a center portion of a top wall surface of each of the air chambers 22 (see FIG. 4). The air chambers 22 are configured with a plurality of center air chambers 22a corresponding to the center air-ejection hole group 30a and a plurality of side air chambers 22b corresponding to the pair of side air-ejection hole groups 30b and 30b.

The center air chambers 22a are formed in a box shape of a rectangular cuboid with its longitudinal direction aligned with the ship width direction, being arranged in the ship width direction. By supplying the air from the blower 16 to the center air chambers 22a, the air is ejected from the center air-ejection hole group 30a to generate the air bubbles.

The side air chambers 22b are, in the same manner as the center air chambers 22a, formed in a box shape of a rectangular cuboid with its longitudinal direction aligned with the ship width direction, being arranged in the ship width direction. The side air chambers 22b are divided into two portions corresponding to a pair of side air ejection holes 15. By supplying the air from the blower 16 to each of the divided side air chambers 22b, the air is ejected from the side air-ejection hole groups 30b and 30b to generate the air bubbles.

Although details are described later, on an outside of the plurality of center air chambers 22a, a center sea chest 35 is formed to cover them. On an outside of each of the plurality of side air chambers 22b which is divided into two, a pair of side sea chests is formed to cover them.

The air flow meter 24 measures, as described above, the flow rate of the air flowing through the downstream-side main supply pipe 20b. Based on a result of measurement of the air flow meter 24, an amount of supplying the air supplied from the blower 16 is controlled.

A plurality of on-off valves 25 respectively provided on the branch supply pipes 21 functions as a so-called check valve, which is installed for preventing an infiltration of seawater into the air supply path 17 on the upstream side from the on-off valves 25. Specifically, when an operation of the ship-body frictional resistance reducing device 10 is stopped, that is, when the driving of the blower 16 is stopped, the ejection of the air from each of the air ejection holes 15 is stopped. This causes the seawater to flow into each of the air chambers 22 via each of the air ejection holes 15. At this time, because each of the air chambers 22 interlocks with each of the branch supply pipes 21, the infiltration of the seawater into each of the branch supply pipes 21 on the upstream side from the on-off valves 25 is prevented by closing the on-off valves 25.

Therefore, when the blower 16 is driven, the air blown out from the blower 16 flows into the primary air tank 23 through the upstream-side main supply pipe 20a, and thereafter, the air flows into each of the air chambers 22 via the downstream-side main supply pipe 20b and the branch supply pipes 21. At this time, the amount of supplying the air from the blower 16 is adjusted by controlling the electric motor 19 based on the result of measurement of the air flow meter 24. When the air flows into each of the air chambers 22, it is ejected to underwater through each of the air ejection holes 15 to generate the air bubbles from the ship's bottom 5.

The sea chests 35 and 36 that covers the air chambers 22, which are characteristic parts of the present invention, are explained below with reference to FIG. 3 and FIG. 4. As described above, a plurality of sea chests 35 and 36 are provided corresponding to the air-ejection hole groups 30a, 30b, and 30b (for example, three sea chests in this embodiment), including the center sea chest 35 that covers the center air chambers 22a and the pair of the side sea chests 36 and 36 that respectively cover the divided side air chambers 22b. The center sea chest 35 and the pair of the side sea chests 36 and 36 have substantially the same configuration. Therefore, the configuration of the center sea chest 35 is mainly explained while explanations of the configuration of each the pair of the side sea chests 36 and 36 will be omitted.

As shown in FIG. 3, the center sea chest 35 is formed in a box shape of a rectangular cuboid with its longitudinal direction aligned with the ship width direction, and is arranged on the ship's bottom 5 inside the ship body 1. With this arrangement, the longitudinal direction of the center sea chest 35, the arrangement direction of the center air chambers 22a, and the arrangement direction of the center air-ejection hole group 30a become the same direction. A space slightly larger than a worker is formed in the center sea chest 35 so that its inside serves as a working area V1 (see FIG. 4). Furthermore, the center sea chest 35 is configured in a watertight structure to prevent ingress of the sea water into the ship body 1, and a connection portion between the center sea chest 35 and the ship's bottom 5 is joined by, for example, welding or the like. In addition, a plurality of insertion ports 40 for inserting the branch supply pipes 21 respectively connected to the center air chambers 22a are formed on a ceiling surface of the center sea chest 35 in a penetrating manner.

At this time, a plurality of longitudinals 45 that extends in the ship length direction and is used as aggregates are arranged in parallel in the ship width direction in the center sea chest 35. Therefore, the inside of the center sea chest 35 is partitioned into the divided working areas V2 by the longitudinals 45. That is, the longitudinals 45 serve as a plurality of partitioning walls dividing the working area V1 in the center sea chest 35.

In each of the divided working areas V2 in the center sea chest 35 partitioned by the longitudinals 45, a part of the center air chambers 22a obtained by dividing the number of the center air chambers 22a by the number of the divided working areas V2 is arranged. Therefore, an intercommunicating through hole 48 is formed on each of the longitudinals 45 so that a worker can pass through each of the divided working areas V2 to perform maintenance of each of the center air chambers 22a arranged in each of the divided working areas V2.

At one side portion of the center sea chest 35 in the ship width direction, an access room 50 is provided being adjacent to the center sea chest 35 at the stern side of the ship length direction. As the center sea chest 35, the access room 50 is formed in a box shape of a rectangular cuboid, and is arranged on the ship's bottom 5 inside the ship body 1. Furthermore, as the center sea chest 35, the access room 50 is configured in a watertight structure to prevent ingress of the sea water into the ship body 1, and a connection portion between the access room 50 and the ship's bottom 5 and a connection point between the access room 50 and the center sea chest 35 are joined by, for example, welding or the like.

On a bottom surface of the access room 50 (that is, the ship's bottom 5), an entryway 51 for a worker to go in and out the access room 50 from outside the ship is formed in a penetrating manner, and an access through hole 52 is formed on a wall between the access room 50 and the center sea chest 35. With this configuration, the worker can come and go to the center sea chest 35 from the access room 50 through the access through hole 52. Therefore, the access room 50 serves as a passage that connects the entryway 51 and the center sea chest 35. A hatch made of a grating material or the like is provided on the entryway 51.

With this configuration, when a worker enters the center sea chest 35 from outside the ship, the worker can enter the access room 50 through the entryway 51, and enter the center sea chest 35 from the access room 50 through the access through hole 52. The worker entered the center sea chest 35 can come and go between the divided working areas V2 through the intercommunicating through hole 48.

A part of the center air chambers 22a arranged in each of the divided working areas V2 in the center sea chest 35 (one in the drawing) is explained below with reference to FIG. 4. Each of the center air chambers 22a arranged in each of the divided working areas V2 includes a lower casing 55 arranged on the ship's bottom side and an upper casing 56 arranged on a shipboard side.

The lower casing 55 is formed in a frame body having a cross section of a rectangular shape, being arrange to enclose the air ejection holes 15 formed on the ship's bottom 5. A bottom portion of the lower casing 55 and the ship's bottom 5 are joined with each other by welding or the like. In addition, a lower flange 59 that protrudes outward from the lower casing 55 is formed at an upper portion of the lower casing 55.

The upper casing 56 is formed in a box shape having a cross section of a rectangular shape with a lower surface opened, being arranged to couple with the lower casing 55. An upper flange 58 that protrudes outward from the upper casing 56 is formed at a lower portion of the upper casing 56. With this configuration, because the lower flange 59 and the upper flange 58 are coupled with each other, by fixing the lower flange 59 and the upper flange 58 with a bolt, the upper casing 56 can be fixed to the lower casing 55. Likewise, by removing this bolt, it is possible to detach the upper casing 56 from the lower casing 55. An air supply port 28 to which the branch supply pipe 21 is connected is formed on a ceiling surface of the upper casing 56.

Therefore, by detaching the upper casing 56 from the lower casing 55, the worker can perform application of an anticorrosion material or removal of the ocean species inside each of the center air chambers 22a, that is, inside the upper casing 56 and the lower casing 55.

As described above, the pair of the side sea chests 36 has the same configuration as the center sea chest 35, and the pair of the side air chambers 22b has the same configuration as the center air chambers 22a.

With the above configuration, it is possible to configure each of the sea chests 35 and 36 in a watertight structure, and at the same time, it is possible to provide the working area V1 between each of the sea chests 35 and 36 and each of the air chambers 22a and 22b. Therefore, it is possible to prevent ingress of the sea water into the inside of the ship body 1, and at the same time, it is possible to perform the maintenance of each of the air chambers 22a and 22b.

Even though the inside of each of the sea chests 35 and 36 is partitioned by the longitudinals 45 into the divided working areas V2, forming the intercommunicating through hole 48 on each of the longitudinals 45 makes it possible to come and go to the divided working areas V2. With this configuration, it is possible to perform the maintenance of each of the air chambers 22a and 22b provided in the divided working areas V2 in an efficient manner.

Furthermore, by forming the entryway 51 on the ship's bottom 5 and providing the access room 50, it is possible to access the inside of each of the sea chests 35 and 36 from the entryway 51 through the access room 50. At this time, because the intercommunicating through hole 48 is formed on each of the longitudinals 45, it is sufficient to form a single unit of the entryway 51 to access the sea chests 35 and 36. In the present embodiment, when three sea chests 35 and 36 are formed, it is necessary to form three entryways 51.

Moreover, because the upper casing 56 can be coupled with the lower casing 55 of each of the air chambers 22a and 22b in a detachable manner, it is possible to easily perform the maintenance of the inside of each of the air chambers 22a and 22b.

Although it is configured that the access room 50 is provided adjacent to the center sea chest 35 and the entryway 51 is formed on the access room 50 to access the center sea chest 35 according to the present embodiment, the configuration is not limited to this method. As shown in FIG. 5, the entryway 51 can be formed in the center sea chest 35 by removing the access room 50. With this configuration, because it is not necessary to arrange the access room 50, it is possible to constitute the configuration of the ship-body frictional resistance reducing device 10 simple.

INDUSTRIAL APPLICABILITY

As described above, the ship-body frictional resistance reducing device according to the present invention is useful for a ship-body frictional resistance reducing device having a plurality of air ejection holes formed on a ship's bottom and particularly useful when maintenance of an air chamber is performed.

The invention claimed is:

1. A ship-body frictional resistance reducing device for reducing frictional resistance of a sailing ship body by forming an air bubble curtain on a ship's bottom by generating air bubbles, the ship-body frictional resistance reducing device comprising:
    an air chamber provided on the ship's bottom inside the ship body;
    a plurality of air ejection holes formed in an arrayed manner on the ship's bottom that becomes a bottom portion of the air chamber;
    a sea chest provided on the ship's bottom inside the ship body in a manner such that the sea chest covers the air chamber; and
    a supply pipe in which air supplied from an air supply source flows toward the plurality of air ejection holes, wherein
    the supply pipe penetrates through the sea chest and is connected to the air chamber.

2. The ship-body frictional resistance reducing device according to claim 1, wherein
    a partition wall for partitioning an inside space is provided in the sea chest, and
    a through hole is formed on the partitioning wall.

3. The ship-body frictional resistance reducing device according to claim 2, further comprising:
    an entryway formed on the ship's bottom; and
    a passage that connects the entryway and an inside of the sea chest.

4. The ship-body frictional resistance reducing device according to claim 1, wherein
    the air chamber includes a lower casing arranged on the ship's bottom side and an upper casing arranged on a shipboard side, and
    the upper casing is configured to be coupled with the lower casing in a detachable manner.

5. A ship-body frictional resistance reducing device for reducing frictional resistance of a sailing ship body by forming an air bubble curtain on a ship's bottom by generating air bubbles, the ship-body frictional resistance reducing device comprising:
- an air chamber provided on the ship's bottom inside the ship body;
- a plurality of air ejection holes formed in an arrayed manner on the ship's bottom that becomes a bottom portion of the air chamber;
- a sea chest provided on the ship's bottom inside the ship body in a manner such that the sea chest covers the air chamber
- an entryway formed on the ship's bottom; and
- a passage that connects the entryway and an inside of the sea chest, wherein
- a partition wall for partitioning an inside space is provided in the sea chest, and
- a through hole is formed on the partitioning wall.

6. The ship-body frictional resistance reducing device according to claim 5, wherein the air chamber includes a lower casing arranged on the ship's bottom side and an upper casing arranged on a shipboard side, and
The upper casing is configured to be coupled with the lower casing in a detachable manner.

* * * * *